US006656042B2

(12) United States Patent
Reiss et al.

(10) Patent No.: US 6,656,042 B2
(45) Date of Patent: Dec. 2, 2003

(54) INTERACTIVE FANTASY LOTTERY

(75) Inventors: Geoff Reiss, Fairfield, CT (US); John Zehr, Seattle, WA (US)

(73) Assignee: ESPN-Starwave Partners, New York, NY (US)

( * ) Notice: Subject to any disclaimer, the term of this patent is extended or adjusted under 35 U.S.C. 154(b) by 118 days.

(21) Appl. No.: 09/817,717

(22) Filed: Mar. 26, 2001

(65) Prior Publication Data

US 2001/0044336 A1 Nov. 22, 2001

Related U.S. Application Data

(60) Provisional application No. 60/192,064, filed on Mar. 24, 2000.

(51) Int. Cl.[7] ........................................ A63F 13/00

(52) U.S. Cl. ........................ 463/17; 463/42; 463/16; 273/138.2

(58) Field of Search ........................ 463/1, 9, 16–19, 463/22, 29, 40–43; 273/269–270, 236, 292, 298

(56) References Cited

U.S. PATENT DOCUMENTS

| | | | | |
|---|---|---|---|---|
| 4,918,603 | A | 4/1990 | Hughes et al. | |
| 5,683,090 | A | * 11/1997 | Zeile et al. | 463/40 |
| 5,887,906 | A | 3/1999 | Sultan | |
| 5,963,915 | A | 10/1999 | Kirsch | |
| 6,000,725 | A | 12/1999 | Nicolosi et al. | |
| 6,004,211 | A | 12/1999 | Brenner et al. | |
| 6,024,640 | A | 2/2000 | Walker et al. | |

FOREIGN PATENT DOCUMENTS

| | | |
|---|---|---|
| WO | WO 98/36809 | 8/1998 |
| WO | WO 00/67215 | 11/2000 |

OTHER PUBLICATIONS

"ESPN.com goes mobile with SBC Wireless and Nokia". Sep. 14, 2000. pp. 1–3. [http:espn.go.com/pr/s/000914wireless.html].*

"ESPN ok, but 3PLAY great!". Feb. 14, 2001, pp. 1–3. [http:www.epinions.com/content_9213546116].*

Web Cite "Scratch–Off Ticket" at http://www.sweepsclub.com.

* cited by examiner

*Primary Examiner*—Mark Sager
*Assistant Examiner*—Aaron Capron
(74) *Attorney, Agent, or Firm*—Margo Maddux; Charles Burman; Greenberg Traurig, LLP

(57) ABSTRACT

An Interactive Fantasy Lottery where lottery players are given game pieces describing discernable actors (people, animals or events) who will be participating in an upcoming event. The performance of the actor will determine the value of the player's game piece. Thus, the player has an incentive to observe the indicated event in order to determine its outcome as well as the value of his game piece. When the game piece is distributed over a computer network and displayed on a web page, the player will be motivated to visit the web page in order to obtain a game piece, and to monitor his performance in the lottery. In so doing, the player is increasing web traffic across the site which in turn increases the value of the advertising contained therein as well as making the web site more successful overall. In one embodiment, the content of the game is one or more sports figures. The lottery player interacts with the game piece to reveal the sports figure or figures. Each sports figure has an associated event that the sports figure is involved in and an associated point value that may be accumulated based on the sports figure's performance. The lottery player holding the game piece with the highest point value after all events have occurred is the winner.

18 Claims, 3 Drawing Sheets

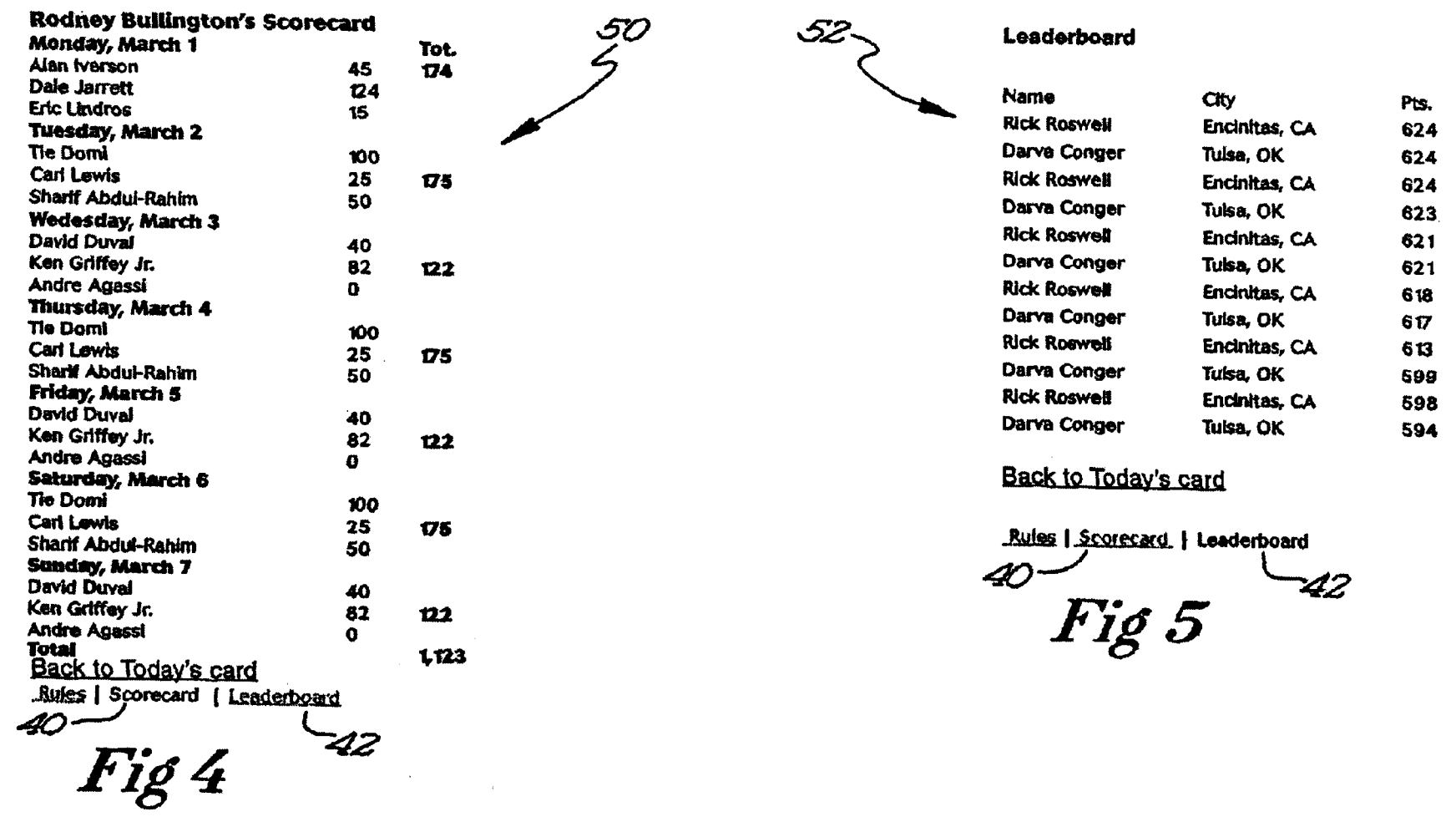

50

Rodney Bullington's Scorecard

| | | Tot. |
|---|---|---|
| **Monday, March 1** | | |
| Alan Iverson | 45 | 174 |
| Dale Jarrett | 124 | |
| Eric Lindros | 15 | |
| **Tuesday, March 2** | | |
| Tie Domi | 100 | |
| Carl Lewis | 25 | 175 |
| Sharif Abdul-Rahim | 50 | |
| **Wedesday, March 3** | | |
| David Duval | 40 | |
| Ken Griffey Jr. | 82 | 122 |
| Andre Agassi | 0 | |
| **Thursday, March 4** | | |
| Tie Domi | 100 | |
| Carl Lewis | 25 | 175 |
| Sharif Abdul-Rahim | 50 | |
| **Friday, March 5** | | |
| David Duval | 40 | |
| Ken Griffey Jr. | 82 | 122 |
| Andre Agassi | 0 | |
| **Saturday, March 6** | | |
| Tie Domi | 100 | |
| Carl Lewis | 25 | 175 |
| Sharif Abdul-Rahim | 50 | |
| **Sunday, March 7** | | |
| David Duval | 40 | |
| Ken Griffey Jr. | 82 | 122 |
| Andre Agassi | 0 | |
| **Total** | | 1,123 |

Back to Today's card

Rules | Scorecard | Leaderboard 40 42

*Fig 4*

52

Leaderboard

| Name | City | Pts. |
|---|---|---|
| Rick Roswell | Encinitas, CA | 624 |
| Darva Conger | Tulsa, OK | 624 |
| Rick Roswell | Encinitas, CA | 624 |
| Darva Conger | Tulsa, OK | 623 |
| Rick Roswell | Encinitas, CA | 621 |
| Darva Conger | Tulsa, OK | 621 |
| Rick Roswell | Encinitas, CA | 618 |
| Darva Conger | Tulsa, OK | 617 |
| Rick Roswell | Encinitas, CA | 613 |
| Darva Conger | Tulsa, OK | 599 |
| Rick Roswell | Encinitas, CA | 598 |
| Darva Conger | Tulsa, OK | 594 |

Back to Today's card

Rules | Scorecard | Leaderboard 40 42

*Fig 5*

INTERACTIVE FANTASY LOTTERY

This application claims the benefit of provisional application Ser. No. 60/192,064 filed Mar. 24, 2000.

BACKGROUND OF THE INVENTION

1. Field of the Invention

The present invention relates generally to lottery-type gaming systems. More particularly, the present invention relates to a game of chance that adds variable on-going content, such as fantasy sports players' performances, and contains an incentive to continue to play the game on an on-going basis.

2. Description of the Related Art

Traditional scratch-off lottery games are well known in the art. To play these games, a purchaser buys a ticket for a set price, usually $1 to $5, at any of a number of authorized ticket outlets such as gas stations. After the ticket is purchased, the purchaser removes opaque material which obscures the winning or losing gaming indicia imprinted thereon. Once this coating is removed, the purchaser will know if he holds a winning ticket. The fact that the winning or losing gaming indicia is pre-printed on the ticket distinguishes this form of lottery game from the various other forms in which winning numbers are drawn some time after the sale of the ticket.

These categories of games and all the other currently available instant lottery games have a predetermined number of winning tickets. The ticket that has the winning indicia is sold randomly among the other tickets. The purchaser has no role in making the ticket he buys a winning one, nor has he the choice of entering his lucky numbers as he does in purchasing the conventional lottery ticket.

Scratch-off lottery tickets suffer from several drawbacks. These include the costs of printing tickets, the physical inventory costs, the costs to the lottery authority and retailer associated with unsold tickets, the inability to effectively offer low-price games (e.g., $0.25, $0.10), and the limited game choices for the player.

Some of these drawbacks can be overcome by implementing similar games on-line using the Internet or other suitable computer networks. The computer network, the user or purchaser, the software involved in facilitating the game, and so forth, is commonly refered to as a remote gaming system. One such system can be found in U.S. Pat. No. 6,024,640 titled Off-Line Remote Lottery System, which is herein incorporated by reference. In that system lottery games are typically embodied in a ticket having multiple plays which represent a single overall outcome offered by a lottery authority. They are rendered on a gaming computer as an "electronic ticket," such as a dedicated hand-held device or programmed general personal computer, which enables a player to reveal the ticket outcome with the same convenience as typical paper scratch-off tickets.

An important aspect of the lottery games referenced above is the content of the game. Lottery Authorities and other game promoters expend a substantial amount of effort trying to increase the satisfaction derived by a purchaser of a ticket. Traditional lotteries have increased player satisfaction by allowing players to pick their own numbers. Additionally, these lotteries build suspense by players having to wait to see what the winning numbers are.

With instant lotteries, all the numbers are pre-printed and the outcome is immediately apparent. Thus, instant lotteries must resort to more intricate gaming indicia on the ticket.

For instance, an instant lottery player derives more satisfaction from scratching off all the spaces on a tic-tac-toe grid to see if he has three identical dollar values in row than he does from simply scratching off one space that says either "lose" or "win". The content must continually be changed and improved to keep sales from falling off, and must be dramatically improved to increase sales.

Thus, known lotteries do not provide content that makes the game more satisfying and interesting, nor do they build suspense in the players as they await an outcome. Furthermore, no content exists in known lotteries between the time a ticket is purchased and the time the winning numbers are announced. Additional on-going content during that time would increase player satisfaction and thus ticket sales.

Finally, known lottery games do not have a game component that encourages a single player to play repeatedly, day after day, other than the usual enticement of a chance to win money with the individual ticket purchased. Such a component becomes important when the game is played on-line using the Internet or other suitable computer network where the player interface (such as a web page) contains other content such that the game administrator derives value from the simple fact that a player views the interface.

The ability to drive users of a computer network to a particular site on the network, is extremely important from a business perspective. First of all, if there are goods or services for sale at that location, the more people that see them, the more they will be purchased. Second, the owners of such locations commonly sell advertising space to other purveyors of goods and services. The more people that visit the location, the higher the price for which that advertising may be sold. Another important goal for the owner of any location on a computer network is to collect demographic information about the people who visit the location. The more detailed the information is, the more valuable it is to the marketing efforts of the owner of that information. The information can also be sold, or can be used to convince advertisers that they would benefit from advertising at that location.

Therefore, there exists a need to provide a lottery type game that provides instant and ongoing content to heighten the satisfaction that a player derives from playing without increasing the skill level required to play and while providing an incentive to play continuously. There exists a further need to provide such a game on-line for the purpose of driving users of a computer network to a player interface displaying other content such as advertising, and to encourage players to play repeatedly.

SUMMARY OF THE INVENTION

The present invention provides an interactive fantasy lottery type game. Game pieces contain content, the meaning of which will change or develop over time to determine who wins the lottery at a set point in the future. The content is ordinarily assigned by the game's organizer or facilitator rather than chosen by the player. In one embodiment, the content of the game is one or more sports figures. The lottery player interacts with a game piece to reveal the sports figure or figures. Each sports figure has an associated event that the sports figure is involved in and associated point values that may be accumulated based on the sports figure's performance. For instance, a basketball player may count for points based on 3-pointers made, a boxer if he knocks his opponent out, or an auto racer if he gets in a crash. The player can then monitor the progress of his sports figures in an upcoming contest or contests, can check the results later, or can rely on the game's administrator to tabulate the results. Accordingly, a player can spend any desired amount of time and effort experiencing the content of the game, but need not exhibit any skill in picking sports figures, monitoring the status of the game, or tabulating results, in order to play and win. A player whose sports figures accumulate the most number of points over a specified period of time, wins the lottery. Alternatively, a selected number of players with the highest totals of points may receive varying amounts of prizes. More players are likely to be encouraged to play this type of game because they can effectively play against other players that they know, and they can discuss how their game piece is doing. Other on-going content such as stock performances, award ceremonies, or other measurable but yet to determined, reality-based outcomes are contemplated.

Because the outcomes of on-going contest games are not predetermined, a substantial likelihood of a tie exists. Consequently, the game provides for tie-breakers. In one embodiment, the winner is selected from a drawing of all players tied. In another embodiment, the tied players split the money to be awarded equally. In another embodiment, the tied players each receive one or more additional game pieces and the player with the highest total from that set of sports figures and events wins. Any of these embodiments are equally applicable in games where there is more than one prize such as a first, second, and third prize with corresponding decreasing value.

In another embodiment, the game is administered through the use of a computer network. In this embodiment, anyone with access to the computer network can play the game. A player must first access the server site or web page containing the data files corresponding to the game to display an electronic game piece on a player interface. In order to establish who the player is, and to associate him with the game piece, the player must login to the game by providing identifying indicia such as a username and password. First time players may also be required to provide additional information for the purpose of notifying the player in the event that he wins. Once a player is successfully logged in, he can interact with the game piece using a mouse or other input device to reveal the gaming indicia on the electronic ticket. The gaming indicia consists of one or more, and preferably three, sports figures. The player has no control over which sports figures are on his ticket. Associated with each sports figure is an upcoming sports event that will feature that sports figure, and associated point values to be awarded to the ticket holder based upon the sports figure's performance. The point values may be associated with any measurable statistic. Once the player has revealed all of his sports figures, his entry is recorded.

The game operates by virtue of an associated software program, player data files, and a database of sports figures, such that it can keep track of the point totals associated with each sports figure and accumulated by each player. A given player's totals can be displayed on the player interface in response to input from the player as can the current standings showing which players have the highest point total and at the end of that game, which players win prizes. The player who ends up with the most points after the completion of all events wins. A player may be required to log back on in order to win, or may be notified by e-mail or other equitable media. This embodiment may also incorporate the tie-breakers and multiple prizes previously discussed.

In another embodiment, more than one set of events and associated sports figure performances counts toward the total points in a single game. Thus, a player may acquire more than one ticket in a single game with the point total of all tickets determining the winner or winners. In this embodiment, no one player can be given the opportunity to get more tickets than any other player. On the other hand, all players have an incentive to acquire the maximum number of tickets possible. Therefore, each player may only obtain a set number of tickets in a set amount of time.

In another embodiment, multiple tickets may be obtained by a player, as in the previous embodiment, but each single ticket must be obtained within a certain prescribed time which is less than the total time that the game runs. For example, a player may obtain only one ticket per day with the total point value at the end of a week determining the winner. Thus a player has an incentive to play every day. This embodiment is particularly useful for the purpose of driving users of a computer network to a player interface displaying other content such as advertising or the sale of goods or services, because it encourages players to visit that same player interface every day. Value is derived, mostly by way of advertising, from the act of a player accessing the game, and that value can be increased by the incentive to access the game repeatedly. Because of the value to the game administrator that can be derived from the act of playing the game, the game itself can be offered for free. Thus, players have more incentive to play the game, and thus view the player interface and its total content, because they can win without having to pay anything to play as they would have to in order to play traditional lotteries.

BRIEF DESCRIPTION OF THE DRAWINGS

FIG. 4 is a sample scorecard detailing a particular player's cumulative scores as they have been acquired over time.

FIG. 5 is a sample leaderboard detailing the scores of the current highest scoring players who are actively participating in the game.

DETAILED DESCRIPTION

Figure 1:
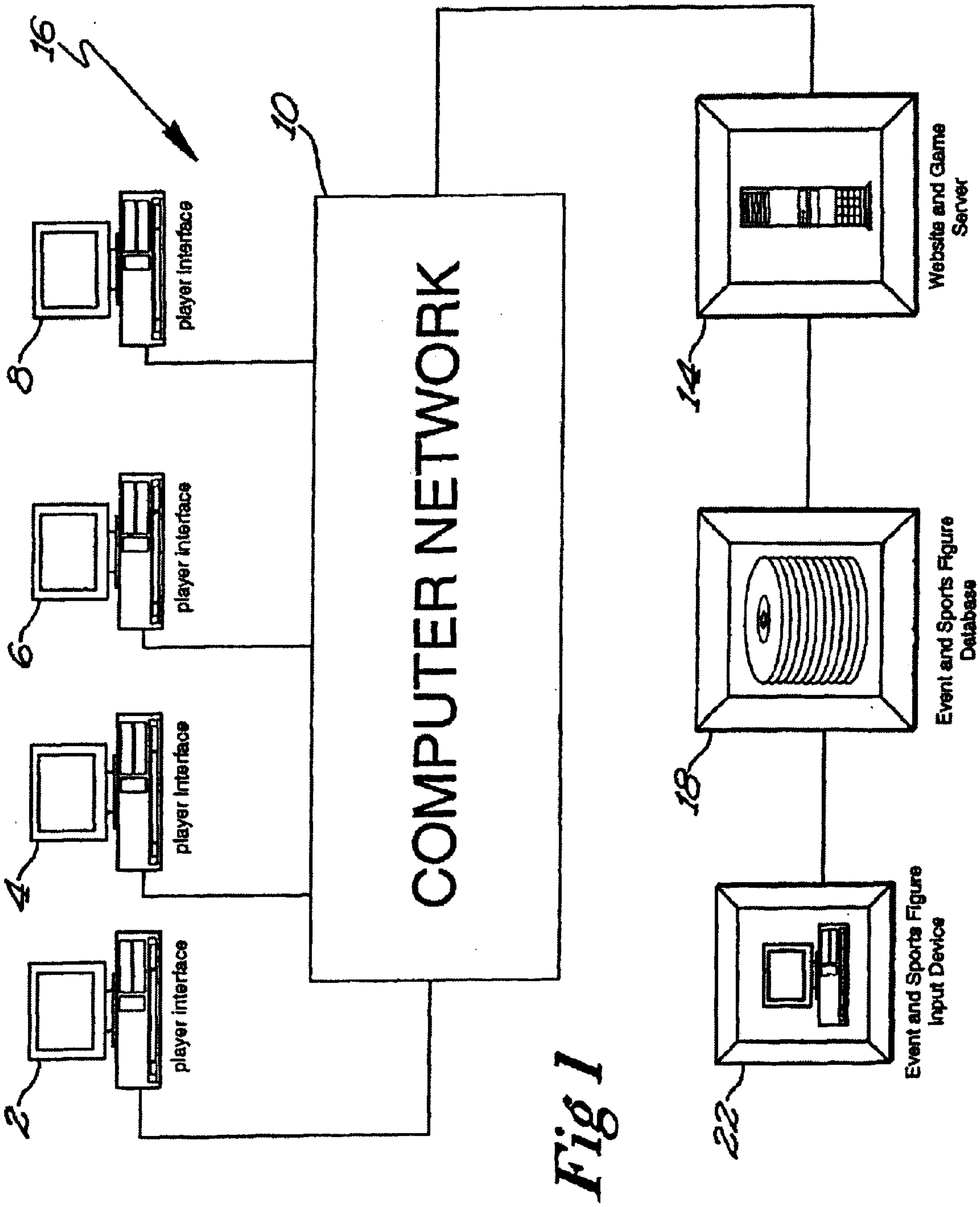
FIG. 1 is a schematic illustration of a computer network employing interactive terminals for playing and hosting the electronic gaming program of the present invention.

Referring to FIG. 1, a computer network 10 is illustrated that allows for the interconnection of a plurality of data terminals. Virtually any data exchanging electronic devices so connected could utilize the present invention. For illustrative purposes, the present invention will be described with reference to a general purpose computer network, such as the Internet and more specifically to terminals using a common protocol. Presently, the most commonly employed protocol is HTML (Hyper Text Markup Language) which facilitates access to the World Wide Web (WWW). Within that protocol, various terminals such as personal computers 2, 4, 6, and 8 connect to the Internet, typically through an ISP (Internet Service Provider), and interact by running a client browser. By so doing, they are able to request information from other connected computers, most often servers 14 that host Web pages. Generally, the host servers 14 are also connected to the Internet via an ISP. A client browser 2, 4, 6, 8, issues an HTTP (Hyper Text Transfer Protocol) request based upon a unique addressing function or URL (Uniform Resource Locator) that identifies a specific page of material. When server 14 receives such a request, it responds by issuing the requested page to the client, assuming that client is allowed access.

Once the client browser 2, 4, 6, 8, receives the information, it reconstructs the data in the form of a graphical page containing text, images, video and/or audio. However, once the page has been delivered, there no longer exists a link between the client 2, 4, 6, 8, and the host 14. Often times, the delivered pages will contain hyperlinks that when engaged by the client, will cause the client browser to issue another HTTP request. Alternatively, the client can directly enter (or obtain from a stored collection) any other accessible URL, initiating another HTTP transaction.

The success of a server's Web page is based in large part on the amount of traffic it generates. That is, the number of times the page is accessed by clients. Furthermore, the Web site becomes more successful as clients access related pages within the site, providing opportunities to present more advertising and gather information from the client. In addition, many sites offer products or services for sale. Thus, it becomes important to provide content within the site that attracts and maintains a client's attention and causes the client to repeatedly visit the site.

In the context of the present invention, this content is provided in the form of an electronic gaming opportunity. That is, server 14 provides an interactive lottery opportunity to the client wherein the interactive lottery is related to the subject matter of the associated web site. For example, a sports Web site could have a lottery based upon sports figures and sporting events. A financial Web site could have a lottery based upon the performance of the market or particular indicators. Preferably, the events used have non-determined outcomes. In the sporting events context, the lottery could offer prizes or points for each point a particular team or player scores. Thus, the final outcome is not known until some future point.

In order to provide this level of interaction, a database 18 of the associated event's activities must be maintained, and in some cases updated by manual interaction via a console 22. If the lottery relates to multiple sporting events that occur at various times, these events and their outcomes must be tracked and recorded so that the results of the lottery are determinable. Of course, such a system should be used initially to provide a pool to draw allotted sports figures, teams, or conferences from. Thus, database 18 can be a separate terminal coupled to server 14 for the purpose of providing this information, or database 18 can simply be a program running within server 14 to accomplish the same task. As yet another alternative, the information can simply be acquired from a trustworthy web site by having server 14 initiate the proper HTTP requests.

Figure 2:
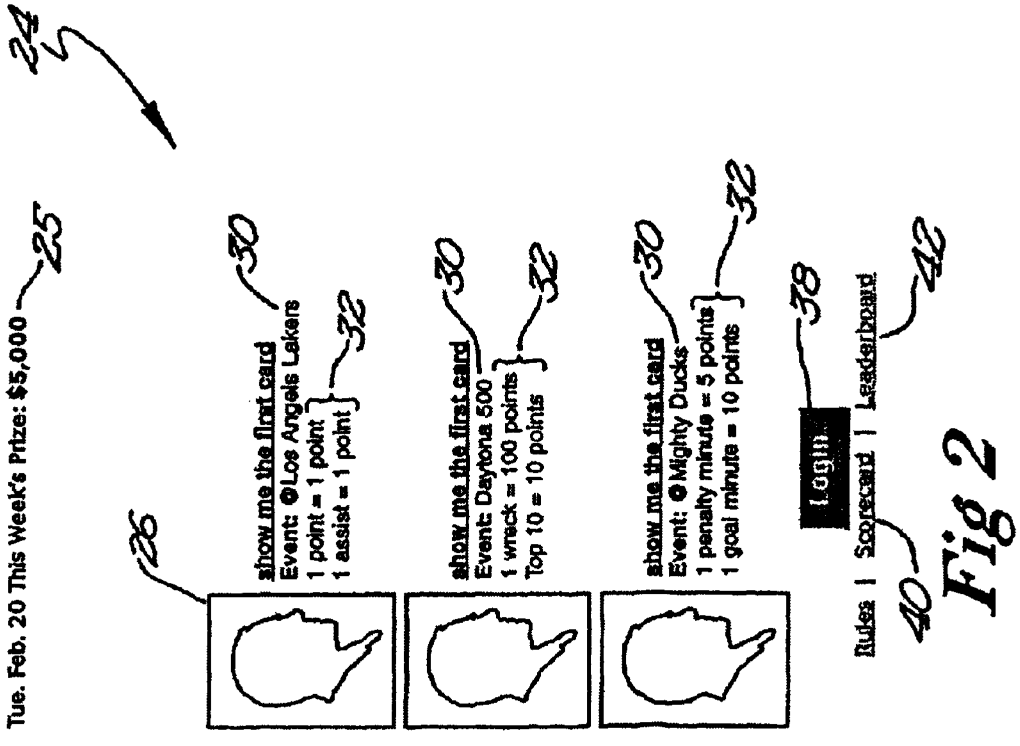
FIG. 2 is an electronic gaming piece prior to its acceptance and activation by a player.

FIG. 2 illustrates a sample gaming piece 24 used in an interactive lottery having sports figures as the theme. What is represented is an unactivated gaming piece that is presented to the client either based upon a specific request for such a piece or simply as part of the Web page that is returned by server 14. That is, the piece is electronically displayed on a client browser 2, 4, 6, 8, in response to a request issued to server 14 for certain information. The level of information presented in the unactivated game piece 24 can vary. On one extreme, the piece 24 can simply indicate that it presents a gaming opportunity and requires selection by the client to initiate the game. On the other hand, as presented here the unactivated piece 24 indicates that if the piece 24 is activated, the client will be assigned three sports FIG. 26 (shown in silhouette). Also provided is an event indication 30 listing the sporting event in which each FIG. 26 will participate. Scoring field 32 indicates what each FIG. 26 will need to accomplish in the designated sporting event 30 to acquire the listed amount of points. At the top of the piece, a prize field 25 indicates the amount of the prize being offered for the game as well as the length of the game. As illustrated, this is a weekly game where one large prize is awarded at the end of each week. Shorter or longer time periods can be used accordingly.

As described, the unactivated gaming piece 24 acts as a teaser to the client. The unidentified players 26 have been randomly drawn from a pool maintained within database 14 and hopefully either the prize field 25 or the event indication 30 will appeal to the client, enticing him to play. Since the players 26 are randomly drawn, server 14 can be (optionally) configured to issue new random players to the same client if he requests another unactivated gaming piece 26 (prior to activating the first piece). That way, if a client should draw three events that he has no interest in, he can receive a new piece and hopefully draw events more suited to him.

In addition to providing the above described information, the unactivated gaming piece 26 can include varying amounts of advertising material (not shown). Such material can be used to promote the game or the associated web site. In addition, revenue can be generated from the advertising and can be used to directly support the continuation of the game. In that way, the host can offer the game and receive the benefits in the form of increased client traffic without having to bear the entire expense of running the lottery and providing for its proceeds.

Once a client initially decides to enter the lottery, they must login by engaging login prompt 38. This initiates an HTTP request for an initial login page (not separately shown). In the known way, server 14 can then request information from the client and assign a user name and password. The information gathered can then be used for marketing purposes. Of course, such information must be maintained on the clients/players so that their performance can be tracked and prizes awarded accordingly.

Figure 3:
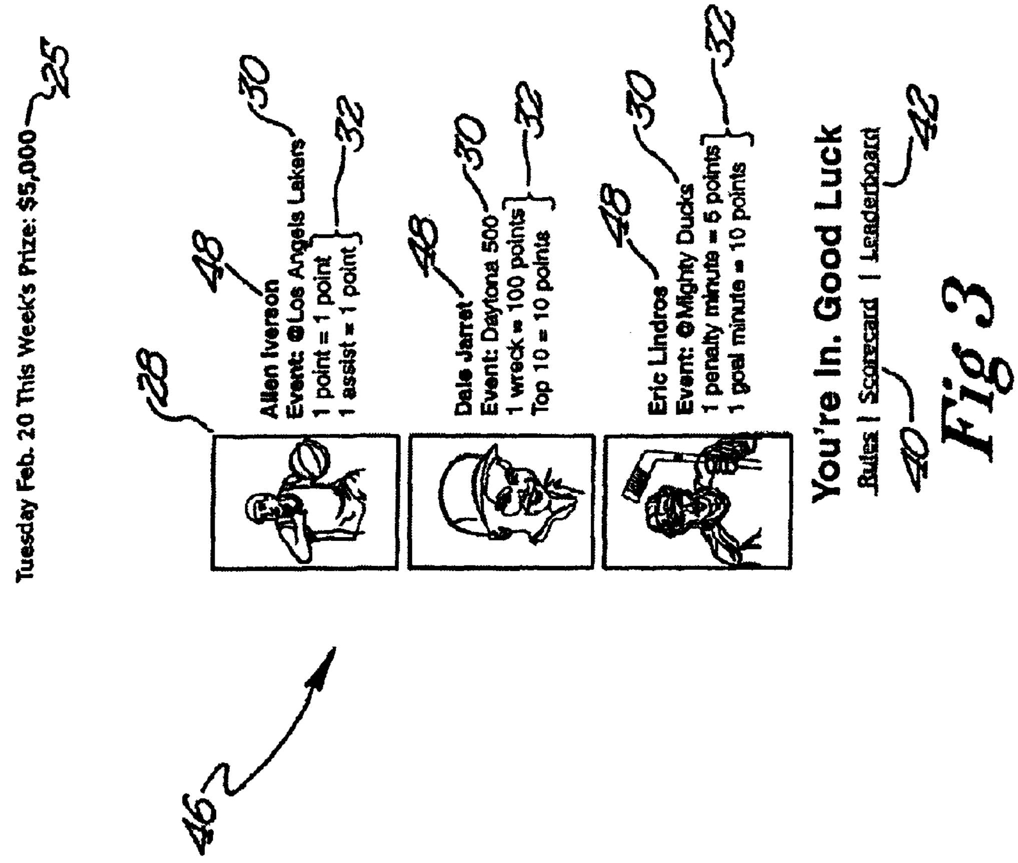
FIG. 3 is the electronic gaming piece after its acceptance and activation by a player.

Subsequently, or if a client has previously been so enrolled, engaging the login prompt 38 allows the client to enter his user name and password. Once done, the data contained within the unactivated gaming piece 24 is activated and an active gaming piece 46 is presented, as shown in FIG. 3. Now, rather than having a teaser, an identification block 48 is presented identifying each of the players. In addition, their silhouettes 26 have been converted into recognizable images 28. Now the client knows which sports figure he should monitor to determine his success in the lottery. As illustrated, "Allen Iverson" is the first randomly drawn sports FIG. 48. For every point he scores or assist he has in the designated game, the client will be credited one lottery point. Likewise, should "Dale Jarret" crash in the Daytona 500, the client will be awarded 100 points.

While the assigning of points will depend greatly upon the content of the server page and the associated game, there should be some correlation utilized if diverse events are being associated. In the present case, with various sporting events being randomly drawn from, the likelihood of success for any given act should be taken into account when assigning points. For example, it is quite likely that "Allen Iverson" will score multiple points in any given game; hence, the lottery points awarded are fairly low for each occurrence. On the other hand, it is much less likely that "Dale Jarret" will crash in a given race, hence the points awarded should that occur are much higher. Preferably, a good mix is afforded so that the client can gain large sums of points if long shots occur, but will also have a more reliable point base to draw from. This will make it more competitive and more interesting to the client, thus hopefully retaining his attention. It should be noted that various sports leagues have policies in place that allow governing bodies to make determinations related to the event, well after its conclusion. Thus, the host will likely have a policy stating that its determinations of any given figure's 48 performance are final.

Once the piece has been activated, the account previously established for the client is credited with the sport figure's 48 indicated on the piece 46. That is, there is no further action required on the part of the client. Once the stated sporting events 30 occur, determinations can easily be made as to how many points to award to each client. Returning to FIG. 1, server 14 can be interconnected (logically if not physically) to sports database 18 to automate this task. At the end of the specified time period 25, the client having the highest number of points will win the indicated prize. In the event of a tie, various tie-breakers can be employed, including random drawings, trivia contests, timed call in periods or any other designated process.

The benefit to the client is the ability to play an interactive sports game that has the potential to provide the stated prize. Sports fans of all levels can enjoy the game because their chance of success does not depend on their sports knowledge, which varies greatly from fan to fan. Yet it is more exciting to the client than instant lotteries because there is an unknown element within the game. Namely, their assigned players or sport figures can greatly increase their chance of success in the lottery, depending upon how they perform in the stated event. This will likely cause the fans to become even more passionate about viewing these sporting events. This has the side benefit of providing a larger viewing populous for these sporting events, which can increase revenues through advertising and ticket sales. Thus, it would not be surprising for Web sites associated with major sporting events or promotions to host such interactive lotteries.

As stated, it is relatively simple to calculate which client wins once the sporting events have reached completion. Of course, the winning client will anxiously await his prize. However, simply facilitating the game, compiling results and doling out prizes is not necessarily the only goal of the present invention. Rather, it is desirable to increase Web traffic across the host's site and to generate significant levels of repeat traffic. To further accomplish this goal, the game can be designed to encourage players to obtain multiple game pieces 46 over a given time period. For example, in the game illustrated in FIGS. 2 & 3, the prize will be awarded after a week of play. Thus a player can be allotted one new game piece 46 per day. Of course, to obtain the piece and have his account so credited, the player must return to that Web site at least once each day. The location of the piece 46 within the host's Web site can be varied, causing the client to view a certain amount of material prior to actually acquiring and activating the piece 46. As each piece 46 is activated, the player's account is so credited and the game proceeds as described above. The number of electronic game pieces 46 allotted to a given player over any given time period can be established within the rules of the game. In some contexts, it may be desirable not to set any limits. Rather, each time a client returns, they will be given a new game piece 46.

Another way to facilitate Web traffic (especially with competitive sports fans) is to provide access to the client's statistics. For example, on the unactivated and activated gaming pieces 24, 46 a scorecard link 40 and a leaderboard link 42 are provided. If the client selects scorecard link 40, server 14 provides a graphic such as that illustrated in FIG. 4. In this embodiment, the client is able to acquire one new game piece 46 each day. As shown, this client has acquired and activated seven game pieces 46. Thus, the sports figures from each of those pieces 46 along with their acquired points (if known) are displayed. In this manner, the client can determine how many points he has, and hence how well he is doing by accessing the Web page provided by the server 14 and checking his scorecard 50.

The scorecard 50 displays the status of the lottery and allows a given client to determine how many points he currently has in a given session of the interactive lottery. Of course, to truly gauge his performance he will need to compare himself to the other lottery contestants. Thus, by selecting leaderboard link 42, server 14 provides a graphic similar to that illustrated in FIG. 5. Namely, the point totals of the other lottery contestants are displayed in an ordered format. Here, a particular contestant can tell how close he is to winning. The format for the presented statistics can vary. For example, regardless of the particular client's point total, only the top ten point holders may be displayed. Alternatively, every player can be displayed or the client's score and all those above him may be listed. There are a wide variety of formats that could be employed while providing sufficient information.

Thus, what has been provided herein is an interactive electronic gaming experience that serves to enhance play, while simultaneously increasing traffic over a host's web site. The present invention provides a lottery style game where players are awarded sports figures or other discernable actors (people or events) who will be participating in an upcoming event. The performance of the awarded figure will determine the value of the client's game piece. Thus, the client has an incentive to participate in the indicated event by closely observing it to determine its outcome as well as the value of his game piece. The client will also be motivated to repeatedly visit the web site to obtain as many game pieces as possible and to monitor his performance in the lottery. In so doing, the client is increasing Web traffic across the site which in turn increases the value of the advertising contained therein as well as making the Web site more successful overall.

While the present invention has been described within the context of a lottery hosted on a web site with content related to sports figures, it is to be understood that the particular content of the game pieces and their Web based format are not meant to be limiting. That is, the present invention includes any interactive electronic lottery system wherein the content of the acquired game pieces is varied by determinable events in the future.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. An interactive lottery comprising:

a game piece distributed prior to a reality-based event, the game piece comprising indicia, the indicia indicating at least one reality-based event and one or more related sub-events, the sub-event possibly recurring over the course of the event and each sub-event including recurring sub-events, having an assigned point value, wherein the possible outcome of the one or more sub-events is not known prior to the reality-based event, but will be determinable after the reality-based event has commended; and a computer system to distribute the game piece over a computer network and to determine the outcome of the interactive lottery by monitoring the event and calculating the total value of the game piece based on the total number of occurrences of the each of the one or more sub-events and their assigned point values.

2. The interactive lottery of claim 1 wherein the reality-based event is a sporting event and the sub-event is related to the participation of a sports figure in the sporting event.

3. The interactive lottery of claim 1 wherein the total value of the game piece is equal to the sum of the number of occurrences of the sub-event multiplied by the assigned point value assigned to the sub-event, for each of the one or more sub-events on the game piece.

4. The interactive lottery of claim 1 wherein a single lottery player may receive more than one game piece, and the total value of each player's game pieces determines the outcome of the lottery.

5. The interactive lottery of claim 4 wherein the outcome of the lottery is determined over play during a specified period of time.

6. The interactive lottery of claim 1 wherein the computer system further determines the winner in the event of a tie.

7. The interactive lottery of claim 6 wherein determining the outcome of the lottery in the event of a tie comprises drawing from all of the players who tied.

8. The interactive lottery of claim 6 wherein determining the outcome of the lottery in the event of a tie comprises splitting the money reward equally.

9. The interactive lottery of claim 6 wherein determining the outcome of the lottery in the event of a tie comprises distributing another game piece to each player, the player with the highest total from that set wins.

10. A reality based event game comprising the steps of:

creating an electronic game piece indicating at least one reality based event and one or more related sub-events, the outcome of each of the one or more sub-events is not yet known and each sub-event being assigned a value for an occurrence of the sub-event;

distributing the game piece to a player over a computer network, the game piece viewable by the player on a web page;

monitoring the reality based event for the outcome of the each of the sub-events;

calculating the total value of the game piece based on the total number of occurrences of the each of the one or more sub-events and their assigned point values;

determining whether the game piece is a winner; and displaying the status of the game.

11. The reality based event game of claim 10 wherein the reality-based event is a sporting event and the sub-event is related to the participation of a sports figure in the sporting event.

12. The reality based event game of claim 10 wherein the total value of the game piece is equal to the sum of the number of occurrences of the sub-event multiplied by the assigned point value assigned to the sub-event, for each of the one ore more sub-events on the game piece.

13. The reality based event game of claim 10 wherein the computing subsystem is configured to distribute a plurality of game pieces to a client, wherein the value of each game piece distributed to the client is added together to generate a total point also for the client.

14. The reality based event game of claim 10 further comprising the step of requiring the player to login prior to receiving a game piece.

15. The reality based event game of claim 10 further comprising the step of allowing the player the choice to participate in play of the game piece or providing the player with another game piece.

16. The reality based event game of claim 10 further comprising the step of hiding a portion of the sub-event and revealing once the player has decided to play that game piece.

17. The reality based event game of claim 10 further comprising the step of determining the winner in the event of a tie.

18. An interactive lottery comprising:

a game piece distributed prior to a reality-based event, the game piece comprising indicia, the indicia indicating at least one sporting event, one or more participants in the sporting event, and one or more related sub-events having an assigned point value, wherein the outcome of the one or more sub-events is not known prior to the reality-based event, but will be determinable after the reality-based event has commended; and a computer system to distribute the game piece over a computer network and to determine the outcome of the interactive lottery by monitoring the sporting event and calculating the total value of the game piece based on the total number of occurrences of the each of the one or more sub-events as performed by the participant during the sporting event.

* * * * *

UNITED STATES PATENT AND TRADEMARK OFFICE

CERTIFICATE OF CORRECTION

PATENT NO. : 6,656,042 B2
DATED : December 2, 2003
INVENTOR(S) : Reiss et al.

It is certified that error appears in the above-identified patent and that said Letters Patent is hereby corrected as shown below:

Title page,
Item [74], *Attorney, Agent ot Firm*, please delete the word "Burman" and replace with the word -- Berman --.

Column 3,
Line 16, please insert the word "be" after the word "to", to read -- but yet to be determined --.

Column 10,
Line 15, please delete the word "ore", and replace with the word -- or --.

Signed and Sealed this

Eighth Day of June, 2004

JON W. DUDAS
*Acting Director of the United States Patent and Trademark Office*